Inventor
Taber de Forest

United States Patent Office

2,707,236
Patented Apr. 26, 1955

2,707,236

METHOD OF DETECTING FLAWS

Taber de Forest, Northbrook Village, Ill., assignor to Magnaflux Corporation, Chicago, Ill., a corporation of Illinois Application September 9, 1949, Serial No. 114,723

11 Claims. (Cl. 250—71)

The present invention relates to a method of detecting surface flaws and surface discontinuities, and more particularly to a method for the detection of flaws in a surface by the application to the surface of mobile, finely divided indicating material having optical characteristics differing from those of the surface.

The present invention provides a simple, easily employed, inexpensive method of determining the presence of flaws or other surface defects by applying to the surface material which is either colored or fluorescent, and which has optical characteristics differing from those of the surface.

The non-destructive testing method of the present invention utilizes the attraction between powdered material and a liquid present in a crack or defect in order to give a positive indication of the presence of a crack or other surface discontinuity.

More particularly, the present invention includes the step of applying a liquid penetrant to a surface, superficially drying the surface to remove liquid present thereon while leaving liquid in any crack present in the surface, and applying finely divided powdered indicating material to the surface. The indicating material is of such a nature that it will be wetted by and be caused to adhere preferentially to the liquid contained in cracks or other surface defects, the material preferably comprising a relatively large particle size carrier and a relatively small particle size pigment loosely adhering to the carrier but capable of being wetted by and attracted to the liquid contained within the crack so that a deposit of indicating pigment is built up at any defect present in the surface being tested. Following the application of indicating material, surplus indicating material is preferably removed from the surface and the deposit of material within and about any cracks present in the surface is observed visually under usual lighting conditions or in the presence of an exciting illumination in case a fluorescent pigment has been employed.

It is, therefore, an important object of the present invention to provide an improved, extremely simple, positive method for the detection of surface defects.

Another important object of the present invention is to provide a method for the detection of surface flaws by noting the adherence of a finely divided inspection material to liquid present in any flaws in the surface.

It is a further important object of the present invention to provide a method for locating cracks in the surface by the application of a liquid to the surface to be inspected, removing the surface liquid while leaving liquid in any cracks that might be present therein, and applying an indicating powder to the surface, whereby any surface defects are visibly indicated by the adherence of the powder to liquid present in the defects.

Other and further objects of this invention will become apparent from the disclosures in the specification and the accompanying drawings.

Figure 1:
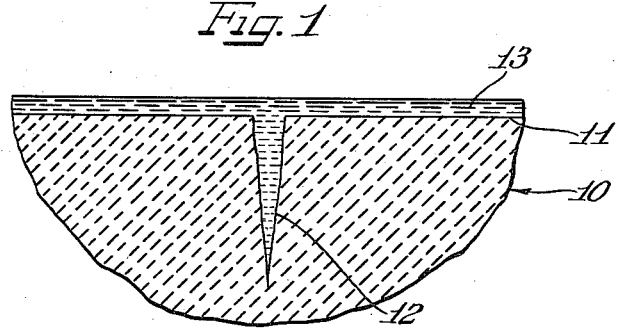
Figure 1 is a fragmentary sectional view of a portion of the surface of an article having a crack present therein, the surface of the article being covered with a liquid layer.

In Figure 1, reference numeral 10 refers generally to an article formed of metal, ceramic material, plastic material, or other material. The surface 11 of the article 10 is shown as having a minute crack 12.

In accordance with the principles of the present invention, the surface 11 is first flooded with a liquid 13 as shown in Figure 1. The liquid 13 is preferably a mineral oil or other suitable liquid having the ability to thoroughly wet the surface 11 and to be attracted by capillary action into and fill the crack 12. Suitable liquid penetrant for this use include petroleum distillates, such as kerosene, "wet-edge" spirits, and high flash-point naphthas. Preferably, a naphtha or mixture of naphthas is used that has a boiling range between 150 and 250° C. and a flash-point above 100° F. The distillate should not be so volatile that it will evaporate quickly under atmospheric conditions. The liquid penetrant may be colorless, colored or fluorescent.

Also, the present invention contemplates the employment of an emulsifiable mineral oil composition, such as a mixture of 80% by weight S. A. E. 10 or S. A. E. 20 oil plus 20% of Turkey red oil (sulfonated castor oil) as an emulsifying agent. The Turkey red oil renders the mineral oil readily emulsifiable with water for a purpose which will be hereinafter described.

The liquid penetrant 13 may be applied to the surface 11 by pouring, spraying, brushing or in other manner. The penetrant must be a liquid that wets the surface to which it is applied.

Figure 2:
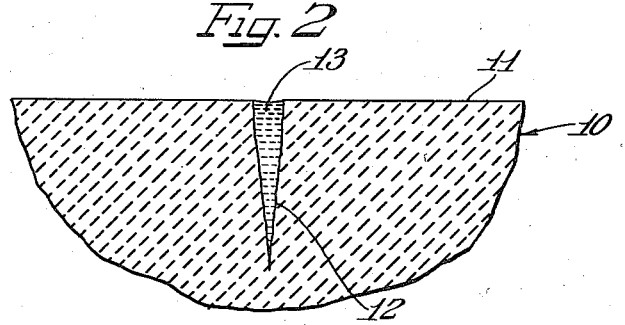
Figure 2 is a view similar to Figure 1 after removal of liquid from the surface but with liquid left in a crack present in said surface.
Figure 3:
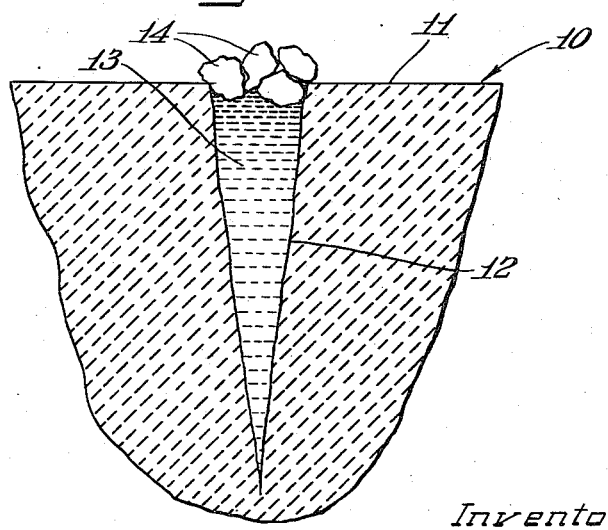
Figure 3 is an enlarged view similar to Figures 1 and 2 showing the indication of the location of the crack by the adherence of inspection material to liquid left within the crack.

Following the application of the liquid penetrant and its penetration into cracks such as the crack 12, the liquid 13 is removed from the surface 11 in such a manner as to leave liquid contained within the crack 12, as is best seen in Figure 2. This removal of superficial liquid may be suitably accomplished by means of an air blast or, alternatively, the liquid 13 may be removed from the surface by merely wiping the liquid therefrom. It is preferred not to heat the article since this would tend to drive the liquid from the crack 12.

When an emulsifiable material is employed, the surface fluid is preferably removed by employing a strong water spray. Inasmuch as the emulsifiable oil is readily dispersible in water, an effective removal of surface oil or emulsifiable material is readily accomplished, and since I prefer to employ a non-voltile emulsifiable oil, residual moisture may be driven from the surface by heating the article to a temperature at which the emulsifiable oil is not substantially volatilized but at which the water content is evaporated.

Even though liquid is removed from the surface, the liquid present in a crack 12 will remain therein as shown in Figure 2 and this remaining oil or liquid is employed to give the visual indication of the present invention.

The next step of the method is to apply to the dry surface 11 a mobile, finely divided indicating powder 14. The powder 14 is applied to the surface 11 by a suitable means, as by dusting or by suspension in an air stream. For example, as the indicating material inorganic or organic pigments having visual characteristics differing from those of said surface 11 may be employed. As exemplary of such pigments I may employ non-fluorescent materials such as metallic oxides, carbon black, cobalt blue, "Permansa" red (o-chloroparanitraniline), toluidine red, or green toner. As exemplary of suitable fluorescent pigments or dyes I may employ zinc sulfide or chrysene, 2,7-dimethyl coeroxen, perylene, and fluorescent emerald green.

I have found that a particularly described powder may be prepared by mixing equal parts by weight of a fluorescent pigment, such as emerald green, and a silica aerogel, such as "Santocel." The silica aerogel functions as a carrier to carry the fluorescent pigment or dye into contact with the liquid left in any crack to give a very prominent indication of the location of the defect. Also, the aerogel has a scrubbing action which aids in the removal of background powder, but which does not interfere with the adherence of the powder held by the liquid 13 in the crack 12.

The effectiveness of the powder is apparently due to the fact that the silica aerogel has a lesser attraction for the fluorescent pigment than the liquid in a crack has for the pigment, so that when the relatively small pigment particles (of the order of from 1 to 10 microns) are carried by the silica aerogel into contact with the liquid, the pigment particles detach themselves from the larger silica aerogel particles and adhere to the liquid, thereby building up a deposit at any crack containing the liquid. In general, the deposit so formed, which is indicated at 14, consists of particles of the pigment. In the case of a relatively large crack, such as indicated at 12, many of the pigment particles may be smaller than the width of the crack, but ordinarily most of the pigment particles will be larger than the width of the crack to be detected. The carrier for the pigment particles is composed of particles much larger than the width of the usual cracks and is therefore not held at the cracks but is swept off of the surface after having left some of the pigment particles at the cracks. In the case of a silica aerogel such as "Santocel," the particles are usually agglomerates of a size that will not pass through a 60 mesh screen. Other carriers that may be used include talc, sawdust, diatomaceous earth and precipitated chalk.

Following the application of the indicating powder, any powder loosely adhering to the general surface, both carrier and pigment, is removed, as by an air blast, which blows off the carrier particles lying loosely upon the surface but which does not disturb the pigment particles adhering to the liquid penetrant 13 in the crack 12.

The inspection of the article treated as above described is carried out either in ordinary light or under ultra-violet or other exciting radiation. The location and extent of any surface defects, cracks, or the like will thus be revealed.

Following the location of the defect, such measures as are necessary may be taken to patch or repair the article 10, or the article may be entirely rejected, as dictated by the circumstances involved.

It will thus be seen that the present invention provides an improved method for the detection of surface defects, flaws or discontinuities and that a positive indication of such defects is afforded. The method of the present invention is well adapted for testing articles on an assembly line basis, since the simple, readily employed sequence of steps of the method requires but little time.

It will be understood that modifications and variations may be effected without departing from the scope of the novel concepts of the present invention.

I claim as my invention:

1. A method of detecting surface flaws, which comprises applying to a surface a liquid penetrant capable of wetting the surface and of penetrating any surface flaws present therein, removing the liquid from said surface while leaving liquid in any flaws therein, applying to the surface a mobile indicating powder, said powder including a coarsely pulverulent carrier and loosely adherent finer particles of a pigment having visual characteristics different from those of said surface, and observing any concentration of pigment on said surface to determine the presence of flaws therein.

2. A method of detecting surface flaws, which comprises applying to a surface a liquid penetrant capable of wetting said surface and of penetrating any cracks present therein, removing the liquid from said surface while leaving liquid in any cracks present therein, applying to said surface a mobile indicating powder, said powder including a carrier of relatively large particle size and pigment particles of less than 10 microns maximum dimension adhering loosely to said carrier particles and capable of being wetted by and of adhering to said liquid penetrant, and observing any concentration of wetted pigment on said surface to determine the presence of cracks therein.

3. A method of detecting surface flaws, which comprises applying a liquid petroleum distillate to a surface capable of being wetted by said liquid, removing the liquid from said surface by a gaseous blast while leaving liquid in any cracks which may be present in said surface, applying to said surface a mobile indicating powder capable of being wetted by said liquid and having optical characteristics in contrast with those of said surface, removing all non-adhering powder from said surface, and observing any concentration of powder adhering to said surface to determine the presence of cracks in said surface.

4. A method of detecting surface flaws, which comprises applying material consisting essentially of only a light petroleum distillate of a boiling range above 150° C. to a surface, removing said distillate from said surface while leaving distillate in any cracks which might be present in said surface, applying to said surface an indicating powder capable of being wetted by said distillate remaining in said crack, said powder including pigment particles of less than 10 microns maximum dimension capable of being wetted by said distillate, removing all pigment particles from said surface not wetted by said distillate remaining in said cracks, and thereafter observing any concentration of pigment particles remaining on said surface to determine the presence of cracks therein.

5. A method of detecting surface flaws which comprises applying to said surface a light petroleum distillate, air-blasting said distillate from said surface while leaving distillate in any cracks present in said surface, applying to said surface a fluorescent indicating powder of less than 10 microns maximum diameter and capable of being wetted by said distillate, air-blasting any excess of non-adhering powder from said surface and observing under exciting illumination the concentration of powder on said surface to determine the crack therein.

6. A method of detecting surface flaws which comprises applying material consisting essentially of a water dispersible oil emulsion to said surface, water washing said emulsion from said surface while leaving oil in any cracks therein, blowing onto said surface an indicating powder having visual characteristics differing from those of the surface and capable of being wetted by and of adhering to the oil remaining in the cracks, removing all non-adhering powder from said surface, and thereafter observing any concentration of indicating powder adhering to said surface to determine presence of cracks in said surface.

7. A method of detecting surface flaws, which comprises applying to a surface a water emulsifiable oil, water washing said oil from said surface, heating to remove residual moisture from said surface, applying to said surface an indicating powder comprising a carrier of relatively large particle size and a pigment of relatively small particle size loosely adherent to said carrier particles but capable of being wetted by and of preferentially adhering to said oil, removing any excess of non-adhering powder from said surface and observing any concentration of pigment on the surface to determine the presence of cracks therein.

8. A method of detecting surface flaws in an article, which comprises flooding said surface with a liquid petroleum distillate having a boiling range above 150° C. and a flash point above 100° F. removing the distillate on said surface while leaving distillate in any flaws present therein, applying to said surface a mobile indicating powder comprising a silica aerogel carrier of larger than 60 mesh particle size and a pigment of less than 10 microns particle size loosely adhering to said carrier, said pigment being capable of being wetted by and of being preferentially attracted by the distillate in any flaws to become attached to said surface at said flaws, removing the indicating powder generally from said surface and observing any build-up of pigment attached to said surface.

9. A method of detecting surface flaws, which comprises applying to a surface material consisting essentially of a liquid penetrant only, capable of wetting the surface and of penetrating any surface flaws present therein, removing the liquid from said surface while leaving liquid in any flaws therein, applying to the surface a mobile indicating powder, removing all non-adhering powder from said surface, and thereafter observing any concentration of powder adhering to said surface to determine the presence of cracks in said surface.

10. A method of detecting surface flaws, which comprises applying to a surface a liquid penetrant capable of wetting the surface and of penetrating any surface flaws present therein, removing the liquid from said surface while leaving liquid in any flaws therein, applying to the surface a mobile powder including carrier particles and finer indicating particles of contrasting color to said surface loosely adherent to said carrier particles but having less affinity for the carrier particles than for the penetrant, whereby the finer particles detach themselves from the larger carrier particles and adhere to the liquid to build up a deposit at any surface flaws containing the liquid, removing substantially all non-adherent powder from the surface, and observing any concentration of powder adhering to said surface to determine the presence of cracks in the surface.

11. A method of detecting surface flaws, which comprises applying to a surface a liquid penetrant capable of wetting the surface and of penetrating any surface flaws therein, removing the liquid from said surface while leaving liquid in any flaws therein, applying to the surface particles of contrasting color characteristics with respect to said surface, removing particles from said surface except those adhering to liquid in a surface flaw, and observing the location of any particles remaining after removal of non-adherent particles by virtue of the contrasting color of the remaining particles to determine the location of any cracks in the surface.

References Cited in the file of this patent

UNITED STATES PATENTS

| | | |
|---|---|---|
| 2,254,609 | Kinzer | Sept. 2, 1941 |
| 2,259,400 | Switzer | Oct. 14, 1941 |
| 2,405,078 | Ward | July 30, 1946 |
| 2,420,646 | Bloom, Jr. | May 20, 1947 |
| 2,478,951 | Stokely et al. | Aug. 16, 1949 |
| 2,516,857 | De Forest et al. | Aug. 1, 1950 |

OTHER REFERENCES

Fluorescent Penetrant, by G. Ellis, Steel, October 16, 1944, pp. 100, 101.